US005383778A

United States Patent [19]

Schulz

[11] Patent Number: 5,383,778

[45] Date of Patent: Jan. 24, 1995

[54] STRENGTH CONTROL EMBOSSING APPARATUS

[75] Inventor: Galyn A. Schulz, Appleton, Wis.

[73] Assignee: James River Corporation of Virginia, Richmond, Va.

[21] Appl. No.: 577,119

[22] Filed: Sep. 4, 1990

[51] Int. Cl.$^6$ .......... B29C 59/02

[52] U.S. Cl. .......... 425/363; 162/113; 162/117; 162/120; 264/284; 425/385

[58] Field of Search .......... 264/293, 284, 119, 167, 264/160; 425/385, 362, 294, 295, 298; 162/109, 116, 117, 120, 113

[56] References Cited

U.S. PATENT DOCUMENTS

| | | | |
|---|---|---|---|
| 304,418 | 2/1884 | Fletcher | 428/153 |
| 1,988,787 | 1/1935 | Fowler | 264/167 |
| 2,405,521 | 1/1937 | Rowe | 383/112 |
| 2,464,301 | 3/1949 | Francis, Jr. | 264/284 |
| 2,662,002 | 2/1951 | Sunderhauf et al. | 156/645 |
| 2,874,618 | 2/1959 | Yang | 162/113 |
| 3,150,416 | 9/1964 | Such | 162/116 |
| 3,301,746 | 4/1964 | Sanford et al. | 162/113 |
| 3,377,224 | 4/1968 | Gresham et al. | 162/113 |
| 3,384,924 | 5/1968 | Schuetz et al. | 425/385 |
| 3,478,141 | 11/1969 | Dempsey et al. | 264/293 |
| 3,541,216 | 11/1970 | Rochlis | 264/284 |
| 3,544,420 | 9/1967 | Murphy et al. | 428/54 |
| 3,817,827 | 6/1974 | Benz | 162/113 |
| 3,969,458 | 7/1976 | Hunter | 264/154 |
| 4,152,389 | 5/1979 | Miller | 264/119 |
| 4,191,609 | 3/1980 | Trokhan | 162/113 |
| 4,671,983 | 6/1987 | Burt | 164/463 |
| 4,803,032 | 2/1989 | Schulz | 264/293 |
| 4,849,054 | 7/1989 | Klowak | 162/109 |
| 4,913,911 | 4/1990 | Wildt | 264/285 |
| 4,921,034 | 5/1990 | Burgess et al. | 162/109 |
| 5,096,527 | 3/1992 | Biagiotti | 425/385 |

FOREIGN PATENT DOCUMENTS

| | | | |
|---|---|---|---|
| 1172845 | 6/1964 | Germany | 264/293 |
| 2112916 | 9/1972 | Germany | 425/385 |
| 3640345 | 6/1988 | Germany | 264/293 |
| 56-1203 | 1/1981 | Japan | 425/385 |
| 152669 | 12/1955 | Sweden | 264/284 |

*Primary Examiner*—Jay H. Woo
*Assistant Examiner*—Duane S. Smith
*Attorney, Agent, or Firm*—Sixbey, Friedman, Leedom & Ferguson

[57] ABSTRACT

A apparatus for embossing paper products, such as paper towels or toilet tissue, in which the tensile strength extending in the machine direction is modified such that after embossing, the tensile strength in the machine direction is more nearly equal to the tensile strength in the cross-machine direction. During embossing, selected portions of the embossed pattern are embossed more deeply to fracture fibers extending in the machine direction, thereby modifying the tensile strength in the machine direction. An improved paper product is thereby formed having a machine direction:-cross-machine direction tensile strength ratio which is more closer to 1:1.

12 Claims, 3 Drawing Sheets

STRENGTH CONTROL EMBOSSING APPARATUS

Technical Field

The invention relates to fibrous paper products, such as paper towels or toilet tissues, and in particular to a method and apparatus for embossing paper products to modify the strength characteristics of the product. The method and apparatus produces an improved paper product in which the longitudinal and transverse tensile strengths are more nearly equal.

BACKGROUND

Paper products such as paper towels and toilet tissue are widely used on a daily basis for a variety of household needs. Typically, such products are formed of a fibrous elongated web which is packaged and sold in rolls. Perforations are provided between sheets of the web to allow the user to conveniently separate a desired portion from the roll for use. In forming the web, very small Grains or fibers produced in a pulping process are bonded together to form an elongated web. The fibers tend to extend in the longitudinal direction, and therefore in the bonding process the fibers are bonded somewhat end-to-end in the longitudinal direction of the sheet, while the fibers are somewhat side-by-side in the transverse web direction. Thus, the web Generally has a greater tensile strength in the longitudinal or lengthwise direction since the fiber bonds are somewhat offset and the strength of the fibers plays a Greater role in providing tensile strength in the lengthwise direction as compared to the width or transverse direction in which the strength of the bond between the adjacent fibers forms a larger component of the tensile strength.

The greater strength in the longitudinal direction is advantageous in that the sheets are generally fed in the longitudinal direction such that the tensile loads incurred during forming and handling are more easily handled by the web. However, often this can lead to problem in consumer use and the consumer's perception of the product. For example, with the greater strength in the longitudinal direction, often it becomes difficult to tear the product evenly at the perforations when the consumer is removing a desired portion from the product roll. Generally, such paper products are mounted on a dispenser and the consumer will utilize one hand to rip one or more towels from the roll. Often the towel will tend to rip along the lengthwise direction instead of tearing evenly along the perforations, due to the increased tensile strength in the longitudinal direction compared to the transverse direction. In use, the paper will often fail due to the lower tensile strength in the width direction (resulting for example in tearing in the longitudinal direction), such that the public will perceive the towel as generally weaker or defective and the consumer confidence is thereby diminished.

To overcome the perception of weakness, the overall strength of the towel may be made stronger, however this results in an even further increase in the strength in the longitudinal or machine direction of the towel with the towel becoming more costly; and the problem in separating the towel from a roll during dispensing is not solved. Thus, it is desirable to form a paper product having tensile strengths in the longitudinal (machine) and transverse (cross-machine) directions which are substantially equal or more nearly equal as compared to the conventionally formed paper web.

Fibrous webs are typically embossed to increase the bulk of the tissue and improve the absorbency, softness and appearance of the product both as individual sheets and in providing a uniform attractive roll package. To provide a uniform and attractive package, previous embossing techniques have been utilized to insure that the embossments of adjacent layers of the roll do not nest. For example, U.S. Pat. No. 4,803,032 to Schulz discloses a method for embossing a porous sheet which results in a uniform roll by preventing nesting of embossments of successive layers of the roll. As disclosed in the Schulz patent, fibrous sheet products produced on a paper making machine are non-uniform in tensile strength. Such fibrous products have a Greater tensile strength in the machine direction (i.e., the longitudinal direction or the direction in which the sheet is fed) than in the cross-machine direction. Thus embossments have been utilized to improve the appearance and absorbency, but have not been recognized as a solution to the problem in providing a fibrous sheet product in which the tensile strengths are more nearly equal in machine and cross-machine directions.

U.S. Pat. No. 3,544,420 to Murphy et al. discloses a creped tissue product for various applications, with the object of the invention to increase the strength of the tissue. Murphy et al. recognizes that the tissue products are particularly weak in the cross-machine direction, and increases the strength of the tissue by utilizing embossment to interlock two or more superposed webs, with the lines of creping at an angle to the longitudinal and transverse directions of the assembled web. Murphy et al. achieves more uniform strength characteristics by disposing superposed stock web layers with the longitudinal directions angled with respect to each other and with both layers angled with respect to the longitudinal edges of the composite. Thus, the strength in the machine and cross-machine directions of the composite each have components of the machine and cross-machine strengths of the stock web components. While such an arrangement provides more uniform strength characteristics, forming of such a composite web requires spiral winding of the stock web which greatly complicates the web forming process. Such an arrangement is not suitable for forming relatively inexpensive, cost competitive paper products such as paper towels and toilet tissue.

U.S. Pat. No. 4,191,609 to Trokhan discloses an absorbent paper sheet and manufacturing method therefor, in which the paper is formed to have an array of uncompressed zones staggered in both the machine and cross-machine directions. In the paper forming operation, prior to the final drying, a network of picket-line-lineaments are imprinted on the embryonic web, with the lineaments including alternately spaced areas of compacted fibers and non-compacted fibers. When creped, the paper provides a relatively high bulk sheet having an improved cross-machine direction to machine direction stretch ratio. However, the Trokhan arrangement complicates the paper forming process and moreover since the strength of the paper is determined during the initial forming, the Trokhan method does not realize the advantage of having an increased machine direction strength during forming and feeding of the web.

SUMMARY OF THE INVENTION

It is an object of the present invention to provide a method and apparatus for modifying the strength characteristics of a paper web such that the tensile strength in the machine and cross-machine directions are more nearly equal. It is another object of the invention to provide a method and apparatus for modifying the strength characteristics of a paper web in which the advantage in having a web with an initial higher tensile strength in the machine direction is utilized, while the tensile strength in the machine direction is weakened prior to final formation and packaging of the web.

It is yet another object of the present invention to provide a fibrous paper product having an improved machine direction to cross-machine direction tensile strength ratio without modifying the initial paper forming operation.

It is a still further object of the present invention to provide an embossing method/apparatus which modifies the strength characteristics of a paper web, and in particular a method and apparatus which may be implemented in existing forming/embossing systems on a retrofit basis.

A still further object of the present invention is to provide an embossing device which modifies the strength characteristics of the web by providing selected portions of protuberances of an embossing roll with heights which are greater than other portions of the protuberances such that fibers of the web are fractured during embossing thereby modifying the strength characteristics of the web.

In accordance with the present invention, a further object is realized in providing a fibrous paper web in which selected portions are embossed more deeply than other portions such that breaking of the fibers extending in the machine direction is achieved and the tensile strength in the machine direction is thereby reduced, thus providing a sheet having more nearly equal tensile strengths in the machine and cross-machine directions.

These and other objects and advantages are achieved in accordance with the present invention in which a web is fed past an embossing device which forms an embossed pattern in the web, with the embossing device including a plurality of protruding members which protrude into the web for forming the embossed pattern. Selected portions of the protruding members have a height which is sufficient to fracture fibers running in the machine direction of the web, thereby reducing the tensile strength of the web. In a preferred embodiment, a conventional embossing roll is provided and surface portions of the embossing roll are engraved away adjacent portions of the protruding members thereby providing the portions of the protruding members with an increased height. A reaction roll or back-up roll is provided which includes an elastic or resilient outer surface for urging the web against the embossing roll such that the elastic surface flows into the engraved portions, and the web is embossed as it passes between the embossing roll and back-up roll resulting in an embossed pattern with selected portions embossed more deeply than others, with the selected portions embossed deeply enough to fracture fibers running in the longitudinal or machine direction of the web. In addition, selected portions of the protruding members can be provided with tapered or inclined side wall portions, while other side walls are substantially vertical, such that the vertical portions have a greater tendency to fracture fibers of the web which extend in the machine direction, thereby weakening the tensile strength in the machine direction.

The above as well as other objects and advantages of the present invention will become apparent from the following detailed description when read in conjunction with the drawings.

DETAILED DESCRIPTION OF THE PREFERRED EMBODIMENTS

Figure 1:
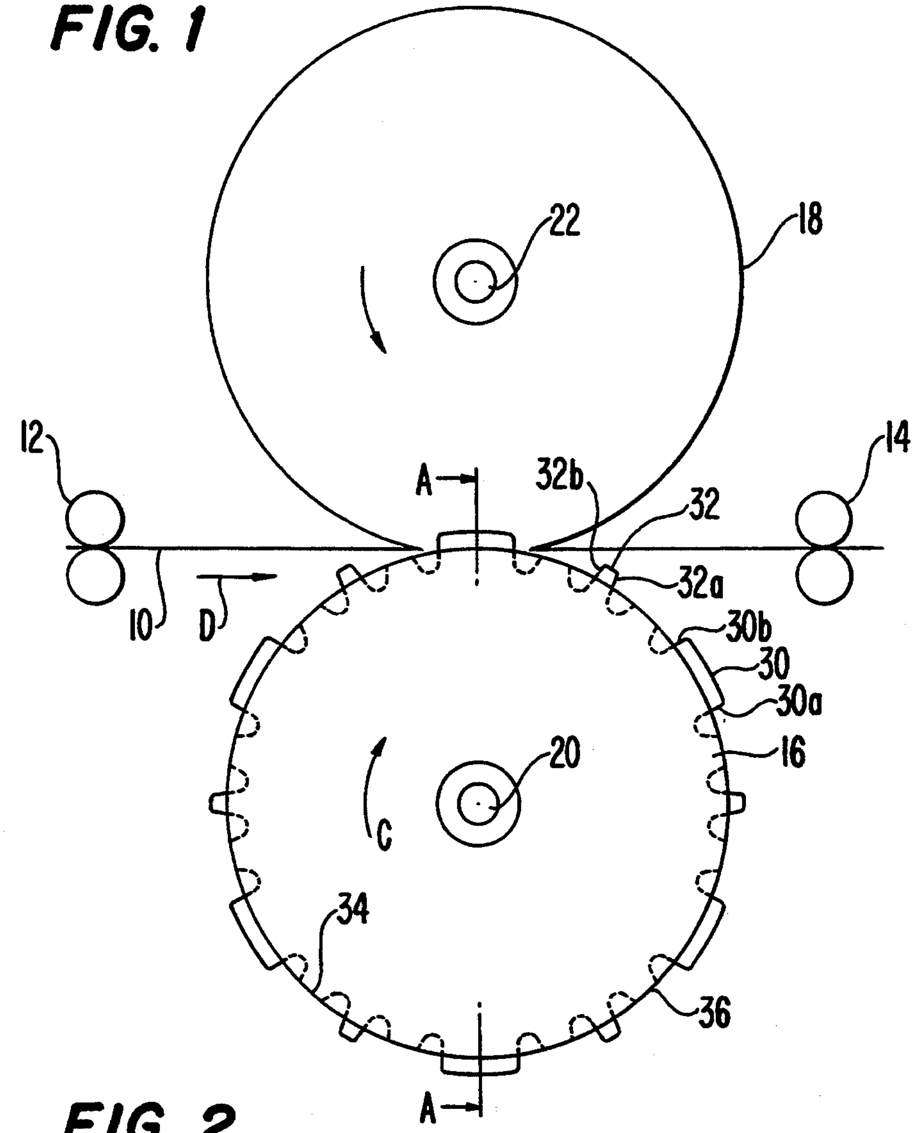
FIG. 1 is a side view of the embossing and back-up roll utilized for modifying the strength characteristics of a web in accordance with the present invention.

As shown in FIG. 1, in accordance with the present invention, a web 10 is fed in the direction of arrow D, for example by upstream feed rolls 12 and downstream feed rolls 14. Preferably, the web is fed in the direction having the greater tensile strength, referred to herein as the machine direction. The web is fed past an embossing roll 16 and corresponding back-up or reaction roll 18 each of which are rotatably mounted upon axles 20 and 22. Back-up roll 18 is formed to have a resilient outer surface, for example formed of rubber such that the web 10 is urged between the rolls 16,18 and the resilient surface of the back-up roll 18 deforms the web about protuberances 30,32 formed on the embossing roll.

Figure 2:
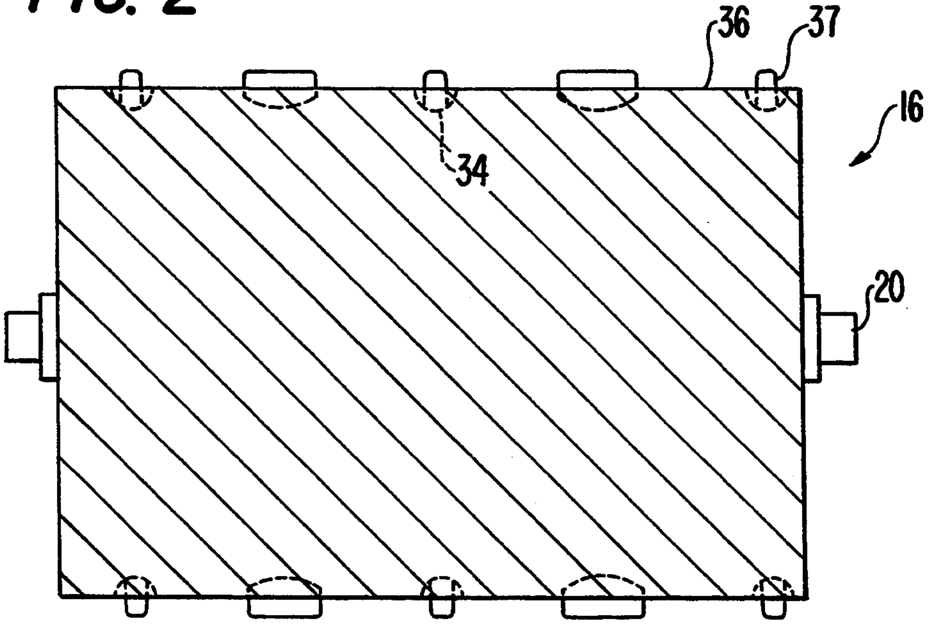
FIG. 2 is a front sectional view of the embossing roll taken along section A—A of FIG. 1.

As shown by dotted lines 34 in FIGS. 1 and 2, portions of the surface 36 of the embossing roll are engraved adjacent the protuberances 30,32 such that an increased effective height of the protuberance is provided. The elastic or resilient roll 18 is urged against the embossing roll 16 as the web passes therebetween, and the rubber flows into the engraved portions, such that a deeper embossment is provided by virtue of the engraved portions. In accordance with the present invention, rolls presently utilized in embossing paper webs may be utilized, with the selected portions (described more fully hereinafter) removed by engraving such that complete replacement of the rolls is not necessary and the existing rolls may be modified to practice the present invention.

Referring again to FIG. 1, the embossing roll will rotate in a direction indicated .by arrow C, and the engraved portions in the illustrated embodiment will comprise the surface portions adjacent the upstream and downstream portions of the protuberances. The downstream portions of the protuberance will be referred to as the portion which contacts the web first as indicated at *30a,32a* when the roll is rotating in the direction indicated by arrow C. The upstream portion will be referred to as the portion which contacts the web last ( in relation to the upstream portion) as indicated at *30b, 32b*. As shown in the embodiment of FIGS. 1–3, the embossing roll includes protuberances 30 having a length running in the machine direction ( transverse to the roll axis ) as well as those having a length extending transverse to the machine direction or in the cross-machine direction (substantially parallel to the roll axis).

In order to reduce the tensile strength of the web in the machine direction, it is necessary to fracture the fibers which extend in the machine direction. To achieve this, it is desired to provide portions which can deeply emboss the web in a direction transverse to the web fibers or in other words in the cross-machine direction. Thus, the edges of the protuberances 30,32 which extend in the cross-machine direction are provided with a height which is greater than that of the dimensions extending in the machine direction. As more clearly indicated in FIG. 3, depressions are formed adjacent to the downstream (3O*a*, 32*a*) and upstream (30*b*, 32*b*) ends of the protuberances so that the ends will have an increased height relative to the remaining portions of the protuberance.

To prevent or reduce rupturing of the fibers in the cross machine direction, the edges shot at 37 of FIG. 2 are preferably inclined. The inclined side walls 37 provide a flatter contact surface which does not cause as much fracture of fibers running in the cross machine direction. The upstream and downstream edges 30*a*, 30*b* are more straight up and down (i.e., perpendicular to the roll surface) such that there is a greater propensity to fracture fibers which extend in the machine direction. The inclined vs. straight feature is particularly effective in reducing strength more in the machine direction since the rubber back-up roll flows about the protuberance and can cause rupture of the fibers more easily on the straight upstream and downstream edges. Note that the upstream and downstream edges may actually have a very slight incline (e.g. 6°–7°) to prevent the edges from being excessively sharp. Note also that the incline or flatness of the edges 37 cannot be excessive since an excessively flat side edge can result in loss of definition of the embossed pattern.

Figure 3:
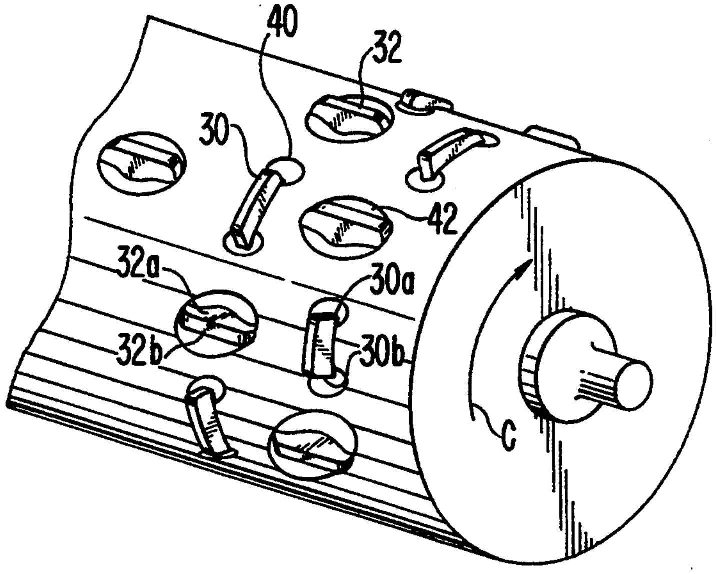
FIG. 3 is a partial perspective view of an embossing roll in accordance with the present invention.

The side walls or edges of the protuberances are shown in FIGS. 3 and 4 with substantially the same incline or angle on all sides. It is to be understood however that if desired, selected sides may be inclined to differentiate the abilities of the protuberances to fracture fibers in the machine direction as opposed to the cross-machine direction. It is also to be understood that the advantageous results of the present invention may be obtained even where the side walls have substantially the same incline. In particular, in the roll shown in FIG. 2, even when utilizing substantially vertical sides at 37, a greater weakening is achieved in the machine direction as a result of the engraved surface portions adjacent the upstream and downstream ends of the protuberances.

Figure 4A:
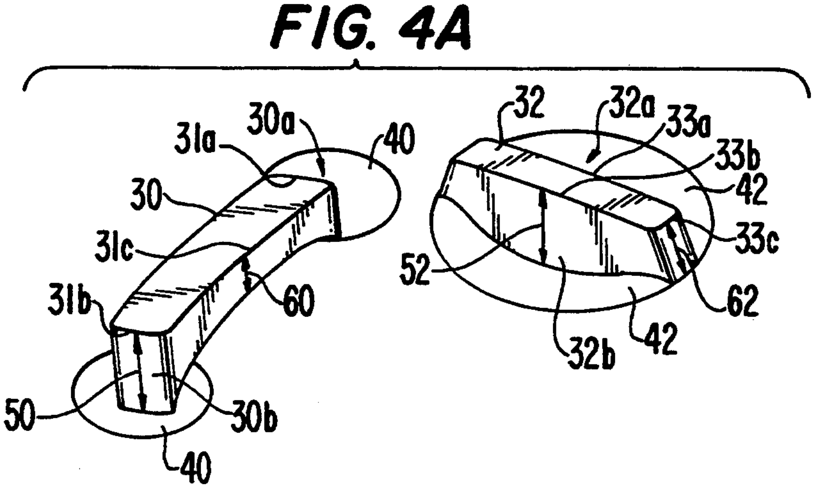
FIGS. 4A–C illustrate perspective views of different protuberance embodiments for use in the embossing roll of FIG. 1.

FIG. 4A shows an enlarged perspective view of the protuberances 30,32 of FIG. 3. As a result of the depressions 40,42 (formed for example by engraving) the height of the upstream and downstream portions of the protuberances will have greater effective heights 50,52 adjacent the engraved portion as compared to the height of the protuberance adjacent the non-engraved portions as indicated at 60,62. During an embossing operation, the edges of the protuberance at which the protuberance has the greatest height will penetrate most deeply into the web, thereby resulting in a fracturing of fibers of the web running in the machine direction and causing a resulting decrease in the machine direction tensile strength of the web. For example, as show in FIG. 4A, the edge portions shown at 31*a*,31*b*, 32*a*,32*b* will penetrate most deeply into the web, with these edges running transverse to the web to thereby fracture the fibers running in the longitudinal direction of the web. The edges will thus penetrate deeply into the web to modify the tensile strength in the machine direction, while the edges running in the machine direction 31*c*,33*c* do not penetrate as deeply.

The above embodiment is merely illustrative of the inventive features of the present invention, however the present invention should not be construed as limited to the above embodiment, as other embodiments are contemplated within the scope of the present invention. Thus, the present invention should not be construed as limited to the use of protuberances having lengths running parallel and perpendicular to the roll axis. A significant aspect of the present invention resides in the embossing of selected portions more deeply than other portions, such that the fibers running in the stronger direction are fractured, while the strength in the cross-machine direction is substantially maintained.

Figure 4B:
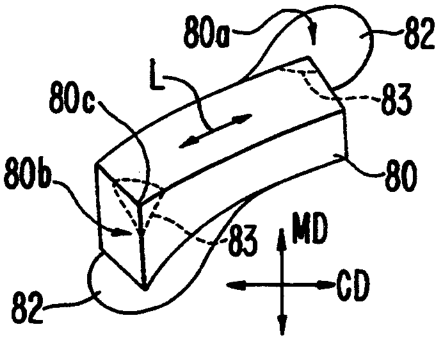

For example, as shown in FIG. 4B, the length of the protuberance 80 may extend at an angle with respect to the machine and cross-machine directions. As in the FIG. 4A embodiment, corresponding protuberances may be provided which extend perpendicular to the protuberance shown in FIG. 4B, however since the engraved portions 82 would be substantially the same, only one protuberance is illustrated in FIG. 4B. As shown in FIG. 4B, portions 82 are engraved from the surface of the roll such that upstream and downstream portions of the protuberances 80*a*,80*b* project more deeply into the web thereby fracturing fibers which extend in the longitudinal direction of the web. The engraved portions will form V and an inverted-V portions of greater depth than the remaining portions of the embossment. Significantly the dimension in the cross-machine direction of the protuberance which protrudes more deeply into the web is greater than the machine direction dimension, such that the effect is to weaken the web in the machine direction by fracturing (in the cross-machine direction) the fibers which extend in the machine direction. Where the protuberances extend at an angle as shown in FIG. 4B, the corner shown at 80C may form the most deeply protruding portion which in addition due to the sharpness of the corner may result in unacceptably large penetration into the web and possible tearing. Unacceptably large penetration may be avoided by rounding the corner or forming a more flattened corner, for example as shown by dotted lines 83 in FIG. 4B.

Figure 4C:
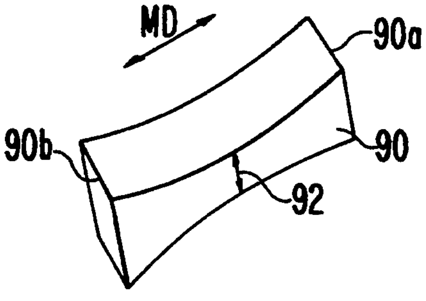

FIG. 4C illustrates yet another embodiment of the present invention in which in lieu of engraving portions from the surface of the roll, the protuberances are provided with varying heights extending from the roll surface. The protuberance 90 shown in FIG. 4C may be utilized in an arrangement in which protuberances run parallel and perpendicular to the machine direction as shown in FIG. 4A or may be utilized where the protuberances extend at an angle with respect to the machine direction as shown in FIG. 4B with additional protuberances optionally extending perpendicular thereto. As shown in FIG. 4C, upstream and downstream edges of the protuberances 90*a*,90*b*have heights which are greater than the heights of the protuberance between the upstream and downstream edges as indicated at 92. As indicated above with reference to FIG. 4B, if the protuberances of FIG. 4C are to be placed at an angle with respect to the machine direction a V-shaped portion may form the more deeply embossing height, with the dimension of the V larger in the cross-machine direction. The portions having the Greater height fracture fibers extending in the machine direction, thereby weakening the tensile strength in the machine direction and providing a sheet having more nearly equal tensile strengths in the machine and cross-machine directions.

Figure 5B:
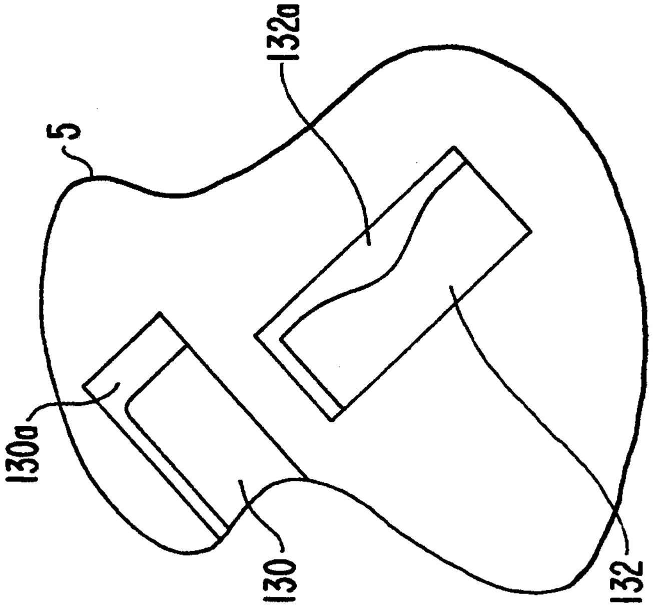
FIGS. 5A and 5B illustrate a perspective view and enlarged perspective section of a paper towel formed in accordance with the present invention.
Figure 5A:
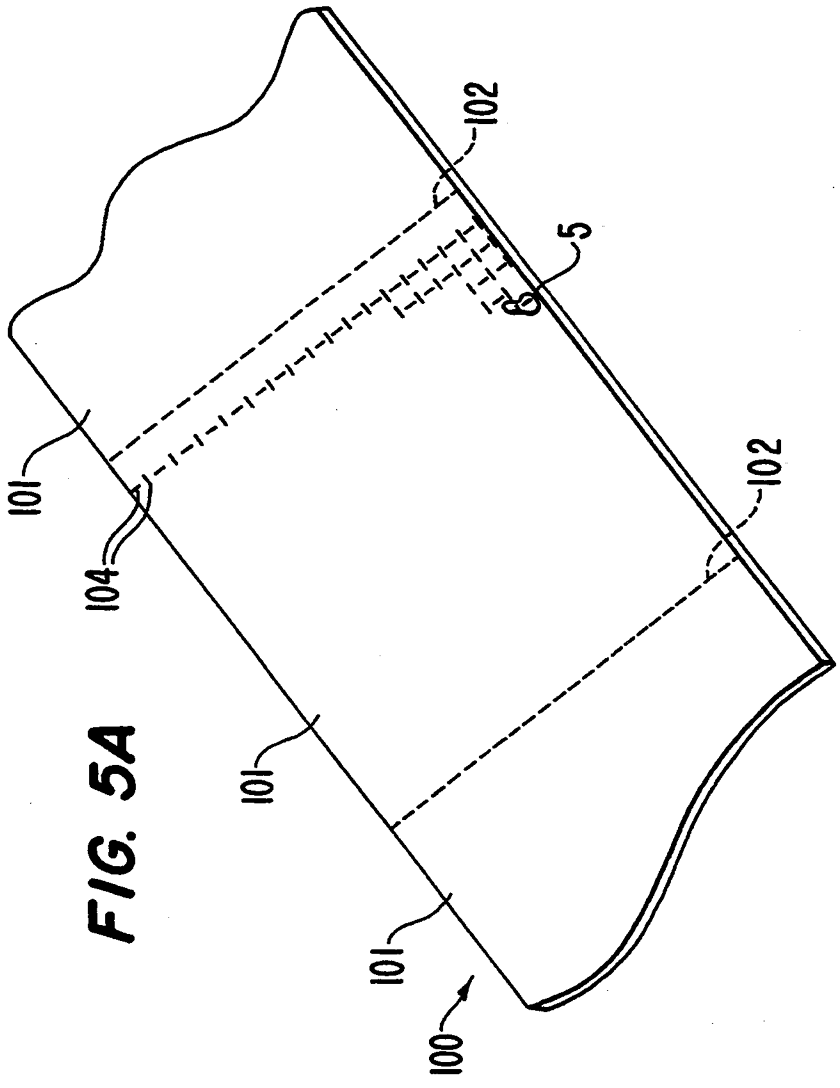

FIGS. 5A and 5B illustrate a perspective view and an enlarged perspective section of a paper towel formed in accordance with the present invention. As shown in FIG. 5A, the elongated web 100 includes a plurality of sheets 101 separated by perforations 102. In a towel formed for example utilizing the embossing roll of FIG. 3, a plurality of embossments 104 are provided as depressions in the web. Only a portion of the embossed pattern is shown in FIG. 5A for ease in illustration, however it is to be understood that the embossed pattern extends substantially across the entirety of the web. FIG. 5B shows an enlarged view of Me section S of FIG. 5A. As shown in FIG. 5B, the depressions resulting from the protuberances of the embossing roll (FIGS. 1–3) includes portions extending with the component of the depression which extends in the cross-machine direction having an increased depth such that fibers of the web extending in the machine direction are fractured. As shown in FIG. 5B, the depression 130 having a length which extends in the machine direction, has a depth which is greater for the (width) edge which extends in the cross-machine direction as indicated at 130*a* (for convenience note numbers of FIG. 5B correspond to the depressions formed by the corresponding numbered element in FIG. 4A, however the numbers of FIG. 5B are in the 100 series.) Similarly, in the depression 132 of the web which extends transverse to the machine direction, the edge of the depression 132A which extends in the cross-machine direction is greater than that for the width of the depression which extends in the machine direction. Thus, the deeper depression is provided for components of the protuberances which extend in the cross-machine direction, thereby fracturing the fibers of the web which extend in the machine direction and producing a towel having more equal tensile strength in both the machine and cross-machine directions.

Note that the depth variation of the embossed pattern of FIG. 5B may be somewhat exaggerated, since, depending on the resilience of the fibrous web, the resulting depth differences may be slight. However, during the embossing as a result of the deeper penetration ( and in the case where inclined and vertical side walls are utilized—e.g., FIG. 2, the more sharp penetration) the web is weakened in the machine direction thereby providing a towel having more nearly equal strengths in the machine and cross-machine directions.

INDUSTRIAL APPLICABILITY

The present invention is particularly suitable for modifying the strength characteristics in paper products, such as paper towels or paper tissues, without requiring additional steps in the manufacturing process, since conventionally such products are embossed to improve their appearance and absorbency. Generally, the plies of a towel or tissue are embossed and subsequently joined by an adhesive, however it is possible to emboss the paper product subsequent to joining of the plies. It should be noted that the protuberances shown in the preferred embodiments are somewhat exaggerated in size, with respect to the roll size, for illustrative purposes.

Typically, the embossing roll would be on the order of 20 inches in diameter and 40–150 inches in length, such that a wide web is embossed and subsequently slit longitudinally to form individual lengths which are then placed on rolls suitable for use by the consumer (for example, a typical paper towel roll is approximately 11 inches in length). The protuberances typically could have a dimension of approximately 20/1000" in width and $\frac{1}{4}$' in length. The depth of the protuberance can be on the order of 20–100 thousandths of an inch, with the variation in depth on the order of 10–70 thousandths of an inch. These dimensions are provided merely as an illustration, and are not to be construed as limiting the present invention.

It is also to be understood that while generally rectangular protuberances have been illustrated, the present invention may be utilized with a wide number of embossing shapes and patterns, with be significant aspect lying in the use of embossments for modifying the strength characteristics of the web.

It is claimed:

1. An apparatus for embossing a fibrous web and thereby modifying the strength characteristics of said web in a machine direction or a cross-machine direction thereof, comprising:

embossing means for forming an embossed pattern in a fibrous web, said embossing means including protruding means for protruding into said fibrous web to form the embossed pattern;

reaction means opposed to said embossing means, for urging said fibrous web against said embossing means, such that said protruding means protrude into said fibrous web;

said protruding means having non-uniform heights such that first portions of said protruding means protrude more deeply into said fibrous web than second portions of said protruding means, said embossing means including a surface wherein said first portions extend to a greater height from the surface thereof than said second portions, said first portions extending in one of the machine direction or the cross machine direction and said second portions extending in the other of the machine direction or the cross machine direction such that the tensile strength of said fibrous web is weakened to a greater extent in the direction in which said second portions extend.

2. The apparatus of claim 1, wherein said embossing means includes a surface from which said protruding mean protrude having engraved portions adjacent said first portions, thereby increasing the non-uniform heights of said protruding means.

3. The apparatus of claim 2, wherein said embossing means includes an embossing roll having said protruding means thereon.

4. The apparatus of claim 3, further including means for feeding the fibrous web through said embossing means and said reaction means such that the fibrous paper web is fed in the machine direction.

5. The apparatus of claim 4, wherein said embossing means includes a roll rotating about an axis, said protruding means including a plurality of protrusions having at least one edge extending in a machine direction substantially transverse to the roll axis and at least one edge extending in a cross-machine direction substantially parallel to the roll axis, wherein the height of the protrusion at the edge extending in the cross-machine direction is greater than the height of the protrusion at the edge in the machine direction.

6. The apparatus of claim 3, wherein said second portions each have a first dimension extending substantially transverse to an axis of rotation of said roll, and said first portions each have a second dimension extending substantially parallel to the axis of rotation of said roll, wherein the second dimension of said first portions is greater than the first dimension such that when a web is fed past said roll, fibers of said web which extend in the machine direction transverse to the roll axis are fractured.

7. An apparatus for embossing a fibrous web to modify the tensile strength of the fibrous web, wherein the fibrous web has a first tensile strength extending along a machine direction of the web, and a second tensile strength extending in a cross-machine direction transverse to said machine direction, the apparatus comprising:

means for feeding said fibrous web in said machine direction; and embossing roll for forming an embossed pattern in said fibrous web, said embossing roll including strength weakening means for reducing said first tensile strength wherein said embossing roll comprises a plurality of protuberances spaced along the surface of said embossing roll for protruding into said web, said protuberances including said strength weakening means which extend in a direction substantially parallel to the axis of rotation of said embossing roll, said strength weakening means having a height from the surface of the embossing roll sufficient to fracture fibers in said web which extend substantially in the machine direction to a greater extent than fibers in said web which extend substantially in the cross machine direction, wherein said strength weakening means includes a pair of parallel edges extending in a direction substantially parallel to the axis of rotation of said embossing roll, said pair of parallel edges having heights from the surface of said embossing roll greater than heights of portions of the protuberances between said pair of parallel edges.

8. The apparatus of claim 7, wherein said protuberances are substantially rectangular in shape having a plurality of side walls extending from the surface of the embossing roll, wherein the side walls located between said pair of parallel edges and the surface of the embossing roll are substantially perpendicular with respect to the surface of the embossing roll and the side walls located between the portions of the protuberances between said pair of parallel edges are inclined with respect to the surface of said embossing roll.

9. The apparatus of claim 8, wherein said protuberances include a major dimension and a minor dimension and said embossing roll includes a first set of protuberances and a second set of protuberances such that said strength weakening means of said first set of protuberances corresponds to the major dimension of the protuberances and said strength weakening means of said second set of protuberances corresponds to the minor dimension of the protuberances.

10. An apparatus for embossing a web and thereby modifying the strength characteristics of said web in a machine direction or a cross-machine direction thereof, comprising:

embossing means for forming an embossed pattern in a web, said embossing means including protruding means for protruding into said web to form the embossed pattern;

reaction means opposed to said embossing means, for urging said web against said embossing means, such that said protruding means protrude into said web;

said protruding means having non-uniform heights such that first portions of said protruding means protrude more deeply into said web than second portions of said protruding means such that the tensile strength of said web in at least one of the machine direction or the cross machine direction is weakened, wherein said protruding means include a major dimension and a minor dimension and said embossing means includes a first set of protuberances and a second set of protuberances such that said strength weakening means of said first set of protuberances corresponds to the major dimension of the protuberances and said strength weakening means of said second set of protuberances corresponds to the minor dimension of the protuberances.

11. The apparatus of claim 10, wherein said first set of protuberances are alternately arranged on the surface of the embossing means with respect to said second set of protuberances.

12. The apparatus of claim 11, wherein the surface of said embossing means includes engraved positions adjacent said side walls located between said surface of the embossing means and said pair of parallel edges.

* * * * *